United States Patent
Sung et al.

(10) Patent No.: US 9,800,825 B2
(45) Date of Patent: Oct. 24, 2017

(54) SEMICONDUCTOR DISPLAY DRIVER DEVICE, MOBILE MULTIMEDIA APPARATUS AND METHOD FOR FRAME RATE CONVERSION

(71) Applicants: Chih-Ta Star Sung, HsinChu (TW); Yin-Chun Blue Lan, HsinChu (TW); Yen Chuo, HsinChu (TW); Chien-Hao Chiu, HsinChu (TW)

(72) Inventors: Chih-Ta Star Sung, HsinChu (TW); Yin-Chun Blue Lan, HsinChu (TW); Yen Chuo, HsinChu (TW); Chien-Hao Chiu, HsinChu (TW)

(*) Notice: Subject to any disclaimer, the term of this patent is extended or adjusted under 35 U.S.C. 154(b) by 51 days.

(21) Appl. No.: 14/634,907

(22) Filed: Mar. 2, 2015

(65) Prior Publication Data
US 2016/0261823 A1   Sep. 8, 2016

(51) Int. Cl.
H04N 7/01 (2006.01)
H04N 11/20 (2006.01)

(52) U.S. Cl.
CPC ........... *H04N 7/0127* (2013.01); *H04N 7/014* (2013.01)

(58) Field of Classification Search
USPC ........... 348/459, 402.1, 407.1, 413.1, 416.1, 348/430.1, 441, 452, 45, 458, 500, 513, 348/670, 699, 701, 715, 317, 352, 155, 348/154, 43; 375/240.03, 240.5, 240.16; 386/239; 455/502
See application file for complete search history.

(56) References Cited

U.S. PATENT DOCUMENTS

| | | | | |
|---|---|---|---|---|
| 8,472,530 | B2* | 6/2013 | Kim | H04N 19/172 375/240.25 |
| 2005/0153721 | A1* | 7/2005 | Chang | H04B 1/70735 455/502 |
| 2006/0088097 | A1* | 4/2006 | Park | H04N 19/433 375/240.03 |
| 2006/0120670 | A1* | 6/2006 | Lee | H04N 5/783 385/55 |
| 2006/0133495 | A1* | 6/2006 | Ye | H04N 7/50 375/240.16 |
| 2007/0078003 | A1* | 4/2007 | Sato | A63F 13/10 463/43 |
| 2007/0097029 | A1* | 5/2007 | Yoon | G09G 3/2927 345/60 |
| 2007/0195040 | A1* | 8/2007 | Park | G09G 3/3648 345/89 |
| 2007/0242926 | A1* | 10/2007 | Huang | G11B 27/105 386/239 |
| 2008/0152001 | A1* | 6/2008 | Yousef | H04N 21/2381 375/240.08 |
| 2008/0165106 | A1* | 7/2008 | Park | G09G 3/2022 345/89 |
| 2010/0158127 | A1* | 6/2010 | Kim | H04N 19/176 375/240.16 |

(Continued)

*Primary Examiner* — Jefferey F Harold
*Assistant Examiner* — Mustafizur Rahman (57) ABSTRACT

A method of frame rate conversion includes receiving multiple input frames including a previous frame, a current frame and a next frame. A changing trend between the current frame and the previous frame is calculated. The current frame is used for generating one or more than one inserting frame according to the changing trend. The inserting frame is output after outputting the current frame to achieve frame conversion.

18 Claims, 8 Drawing Sheets

(56) References Cited

U.S. PATENT DOCUMENTS

| | | | |
|---|---|---|---|
| 2010/0188574 A1* | 7/2010 | Hung | H04N 7/0132 |
| | | | 348/500 |
| 2011/0074920 A1* | 3/2011 | Tsukagoshi | H04N 13/0048 |
| | | | 348/43 |
| 2011/0206126 A1* | 8/2011 | Kim | G09G 3/20 |
| | | | 375/240.16 |
| 2012/0099018 A1* | 4/2012 | Kubo | H04N 7/014 |
| | | | 348/441 |
| 2013/0201377 A1* | 8/2013 | Showering | H04N 5/23258 |
| | | | 348/333.02 |
| 2014/0118522 A1* | 5/2014 | Zuniga | H04N 5/262 |
| | | | 348/77 |
| 2014/0267821 A1* | 9/2014 | Masuura | H04N 7/18 |
| | | | 348/222.1 |
| 2015/0109326 A1* | 4/2015 | Romano | G09G 5/18 |
| | | | 345/618 |
| 2015/0324955 A1* | 11/2015 | Cawley | H04N 1/387 |
| | | | 345/649 |
| 2015/0364109 A1* | 12/2015 | Jain | G09G 5/006 |
| | | | 345/156 |

\* cited by examiner

SEMICONDUCTOR DISPLAY DRIVER DEVICE, MOBILE MULTIMEDIA APPARATUS AND METHOD FOR FRAME RATE CONVERSION

FIELD OF INVENTION

The present invention relates to a semiconductor display driver device, a mobile multimedia apparatus and a method for frame rate conversion and more particularly relates to a semiconductor display driver device, a mobile multimedia apparatus and a method for frame rate conversion that provide shared a frame buffer to decrease die size.

BACKGROUND

Battery is still a critical issue for design of mobile devices. Conventional designs for processing multimedia data may cause larger power consumption that quickly drain limited battery life. In addition, the size and gate counts of processing circuits used in mobile devices are also a great issue to be taken care of.

SUMMARY OF INVENTION

An objective of the present invention includes providing a method of frame rate conversion including following steps. A series of input frames includes a previous frame, a current frame and a next frame. The previous frame refers to a frame before the current frame and the next frame refers to a frame after the current. Nevertheless, the previous frame is not limited to the frame directly adjacent to the current frame and the next frame is not limited to the frame directly adjacent to the current frame.

The current frame is output directly or indirectly to a display device like a LCD panel, a recorder, a projector or any device for receiving multimedia video output. The term "directly" refers to substantially same content of the current frame is output the display device and may includes certain transformation or conversion applied to the current frame. The term "indirectly" refers to a certain processing applied to the current frame and changing certain content of the current frame, i.e. the current frame output indirectly may not have the completely same content as the original current frame.

In addition, a changing trend between the current frame and the previous frame is calculated. After that, the current frame is used as a reference to generate at least one inserting frame according to the changing trend.

The inserting frame is output after outputting the current frame to achieve frame conversion. Alternatively, one or more than one inserting frames may be inserted before outputting the current frame. After the current frame and one or more than one inserting frames are output, the next frame is output.

Frame rate conversion is not limited to doubling frame rates. For example, tripling frame rates or performing any other number of frame rate conversion is also included in the scope of the present invention. When there are more than one inserting frames to be calculate, the changing trend is divided to corresponding sub-trends to be allocated to the inserting frames. For example, if two inserting frames are to be inserted between the current frame and the next frame, the changing trend is divided into corresponding parts to be allocated for the two inserting frames.

The changing trend is obtained by reference to overall motion vectors reflecting changes between the current frame and the previous frame. Specifically, the overall motion vectors are collection of motion vectors obtained by searching best matched blocks of the previous frame in the current frame. Various matured best match block searching methods can be used for obtaining these motion vectors. For example, the current frame is divided into blocks. Each block of the previous frame is respectively taken as input for finding its best matched block in the current frame. When the best matched block is found, an associated motion vector is obtained for each block. These motion vectors may be compared to determine whether an overall movement is applied to the previous frame to get the current frame. This is a common scenario in mobile device design, e.g. sliding of an object on a touch panel causes a wide range of image to be panned to a new location. When such case occurs, the overall motion vectors show a clear trend of consistence. In such case, the current frame and the changing trend from the previous frame and the current frame, e.g. a mean value of motion vectors between the previous frame and the current frame, are used for predicting one or more inserting frames even before the next frame is arrived. Compared with conventional design in which the current frame and the next frame are used for generating the inserting frames between the current frame and the next frame, the frame rate conversion design as mentioned above saves storing space, i.e. only frame buffer size for storing the current frame instead of storing both the current frame and the next frame is necessary. In addition, lagging is also reduced under such design because the inserting frames are generated even the next frame is arrived.

In preferred embodiments, only one frame buffer is necessary to be shared for the previous frame, the current frame and the next frame. Because the inserting frames are generated by prediction, the inserting frames may be compared with the next frame to evaluate whether there such prediction satisfies certain quality requirement. If the quality is decreased dramatically, the prediction processing may be adjusted to another procedure. On the other hand, for power saving or other concerns, even the overall changing trend does or does not seem satisfying a predetermined threshold, the prediction processing for generating the inserting frames may still be forced to turn off or turn on.

In addition, there are usually certain image signal processing, like color space conversion or other panel related processing, need to be processed before the frames are rendered on a display device. The processed result may be stored in the frame buffer. In such case, the changing trend between the previous frame and the current frame may be calculated by comparing the image signal processed results, instead of original content of the previous frame and the current frame. Such modification should be regarded within the scope of the present invention, too.

Another objective of the present invention is to provide a semiconductor display driver device connected to a video processor for processing a series of input frames and includes following components.

A detector is used for detecting whether the video processor is instructing the image processing apparatus to run in a static mode. The video processor may perform such instruction via an independent signal line or embed the commands in the data transmitted to the semiconductor display driver device. In the static mode, no frame change is occurred.

A control device is used for storing one input frame in the frame buffer if the static mode is determined. The control device may be implemented with corresponding logic circuits or codes running on a control device for providing corresponding control functions. An image signal processor is used for converting said one input frame to an output frame to a display device.

In addition, the control device replaces said one input frame in the frame buffer with the output frame and directly outputs the output frame to the display device bypassing the image signal processor after the output frame is stored in the frame buffer. In other words, since the image processed result is already stored in the frame buffer and in static mode, no frame content is changed, the image signal processing may be eliminated if the image signal processed result is already stored in the frame buffer.

In preferred embodiments, the semiconductor display driver device is integrated as a die, which means an integrated component under semiconductor manufacturing. The die may be integrated with the video processor or packaged independently as an integrated chip. When the semiconductor display driver device is implemented with a die, the frame buffer may be implemented as a SRAM component. Because the frame buffer is located in the same die as other components in the semiconductor display device, the overall speed enhancement and power consumption reducing are greatly achieved.

A frame rate converter for generating corresponding inserting frames to be output to the display device may be integrated in the semiconductor display driver device to achieve a predetermined frame rate.

In addition to the static mode, the semiconductor display driver device may also provide a dynamic mode, in which a series of frames are provided by the video processor continuously.

In a preferred embodiment, the dynamic mode is further divided into two sub-types. In first sub-type, the processing flow follows original design. In second sub-type, in which the input frames are analyzed and a desired pattern is found, an optimized frame conversion may be applied.

Specifically, the control device compares difference among the input frames and adopts different processing for generating the output frames according to the compared difference. The series of input frames includes a previous frame, a current frame and a next frame. When the compared difference is smaller than a predetermined threshold, the control device outputs the current frame, calculates a changing trend between the current frame and the previous frame, modifies the current frame to generate at least one inserting frame according to the changing trend, outputs the inserting frame after outputting the current frame to achieve frame conversion, and outputs the next frame after outputting the inserting frame.

When there are more than one inserting frames to be calculate, the changing trend is divided to corresponding sub-trends to be allocated to the inserting frames. As mentioned above, the changing trend is obtained by reference to overall motion vectors reflecting changes between the current frame and the previous frame. The overall motion vectors are collection of motion vectors obtained by searching best matched blocks of the previous frame in the current frame.

In a preferred embodiment, only one frame buffer is necessary and shared for the previous frame, the current frame and the next frame.

The semiconductor display driver device may also include an enabling device for the video processor to turn on or turn off the modifying the current frame to generate at least one inserting frame according to the changing trend.

The aforementioned methods and circuits may be used to implement a mobile multimedia apparatus a display panel, like a mobile phone.

Please be noted that in the aforementioned embodiments, it may save power consumption for logic circuit of the semiconductor display driver device in the static mode. The simplified frame rate conversion, e.g. using the prediction of two or more history frames to generate a future frame, instead of using two frames to generate intermediate frames, may save overall power consumption, particularly in mobile device design, like mobile phone products. When the frame rate conversion is performed in the semiconductor display driver device, instead of the video processor, which in some common products being called application integrated chips, the overall power consumption is decreased because the video processor like application integrated chips usually works with DDR memory devices which run in high frequency thus consuming quite a lot of power. Therefore, although the semiconductor display driver device usually is executed in higher voltage, the overall power consumption is still decreased. Moreover, the frame conversion circuit may be simplified or optimized in the semiconductor display driver device and decreases power consumption. This is against common knowledge and thus nonobvious over current design.

Besides, please be noted that, the input frames, including the current frame, the previous frame or the next frame, may be compressed before storing in the frame buffer. Associated circuits may be prepared to perform dynamic compression and decompression for the frames to store into the frame buffer and move out the frame buffer, respectively. In other words, no matter whether frames are compressed before storing into the frame buffer, all these designs should be regarded covered in the scope of the present invention as defined in the claims and the specification.

Please be also note that in the present invention, the frame buffer in the semiconductor display driver device, in addition to be used for storing still images, may also be used when performing dynamic image processing. This is also an advantage of the present invention. Specifically, in the dynamic mode as mentioned above, the frame buffer, no matter storing compressed or uncompressed reference, or image signal processed or image signal unprocessed images, which may be implemented as an internal memory like SRAM, may still be used during the processing.

DETAILED DESCRIPTION

Figure 1:
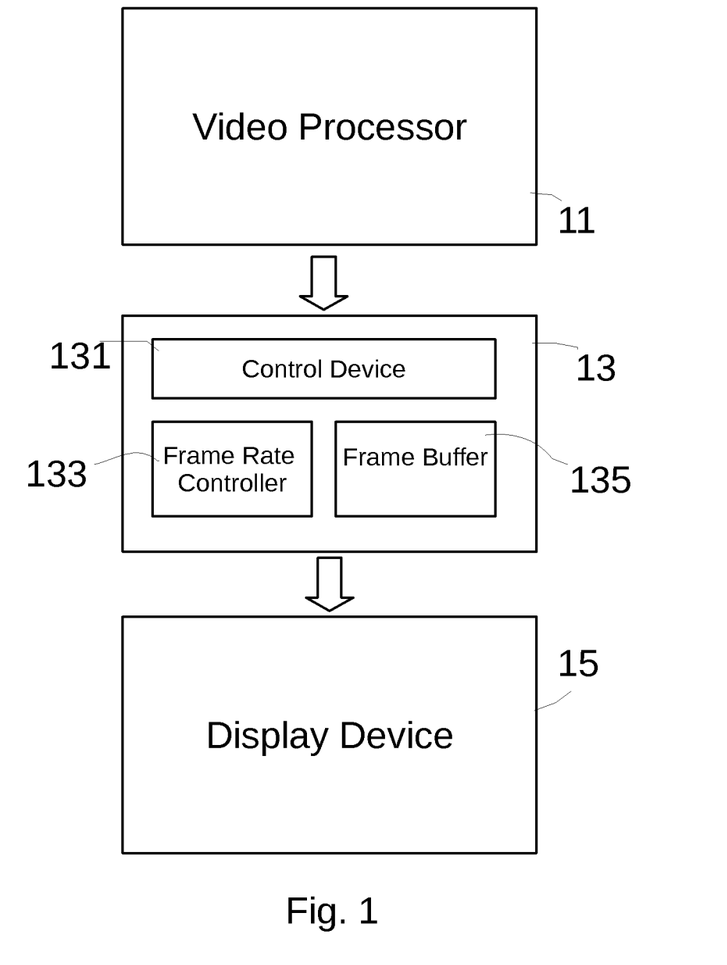
FIG. 1 is a system diagram of a mobile device as an embodiment according to the present invention.

Please refer to FIG. 1, which is a system diagram of a mobile device as an embodiment according to the present invention. The mobile device includes a video processor 11, a semiconductor display driver device 13 and a display device 15. Examples for such mobile device include, but not limited to, a mobile phone, a tablet or any electronic devices. The video processor 11 generates a series of frames as video content. These frames are input to the semiconductor display driver device as a series of input frames.

The semiconductor display driver device 13 includes a control device 131, a frame rate controller 133, and a frame buffer 135. The control device 131 handles major controlling function and the frame rate controller 133 refers to circuit logic particularly relates to frame rate conversion as explained as follows.

In this embodiment, there are two modes, i.e. a static mode and a dynamic mode. In the static mode, the video processor 11 informs the semiconductor display driver 13 that there is no frame changed. In the dynamic mode, the video processor 11 sends a series of input frames to the semiconductor display driver device 13 continuously.

FIG. 2A to FIG. 2D illustrate a processing flow of an embodiment according to the present invention in the static mode.

Figure 2A:
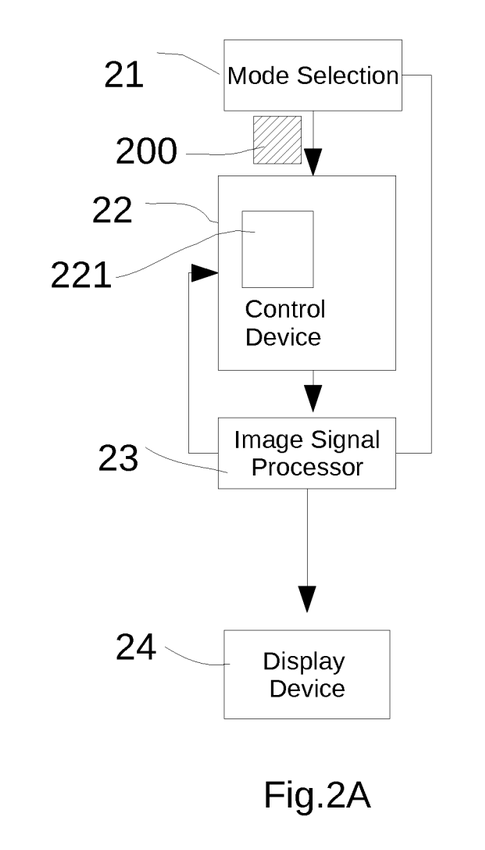
FIG. 2A to FIG. 2D illustrate a processing flow of an embodiment according to the present invention.

The semiconductor display driver device 13 as mentioned in FIG. 1 includes a mode selection 21, a control device 22, a frame buffer 221 and an image signal processor 23.

Figure 2B:
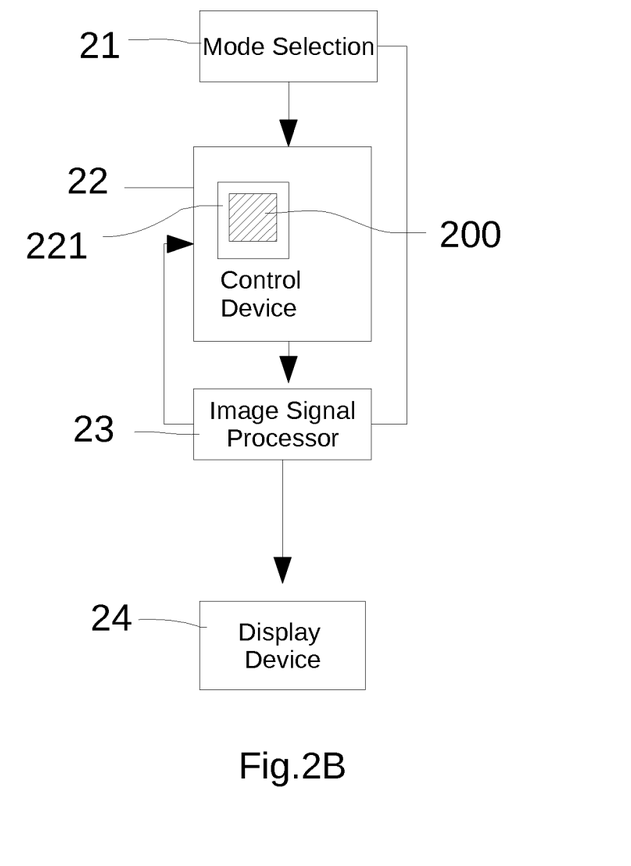

If the mode selection 21 determines the current status is in the dynamic mode, the input frames are sent to the image signal processor 23 directly. On the other hand, if the mode selection 21 determines that the current status is in the dynamic mode, the input frame 200 is stored to the frame buffer 221 controlled by the control device 22, as illustrated in FIG. 2B.

Figure 2C:
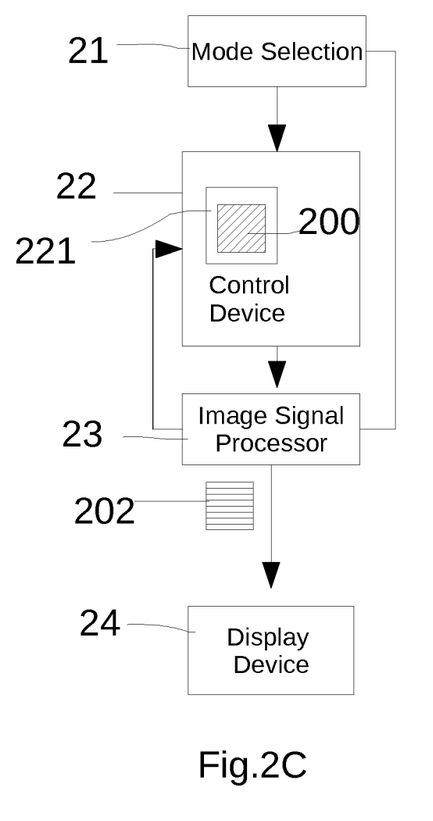

The input frame 200 is then sent to the image signal processor 23 and converted to an image signal processed frame 202. The image signal processed frame 202 is supplied to the display device 24, as illustrated in FIG. 2C.

Figure 2D:
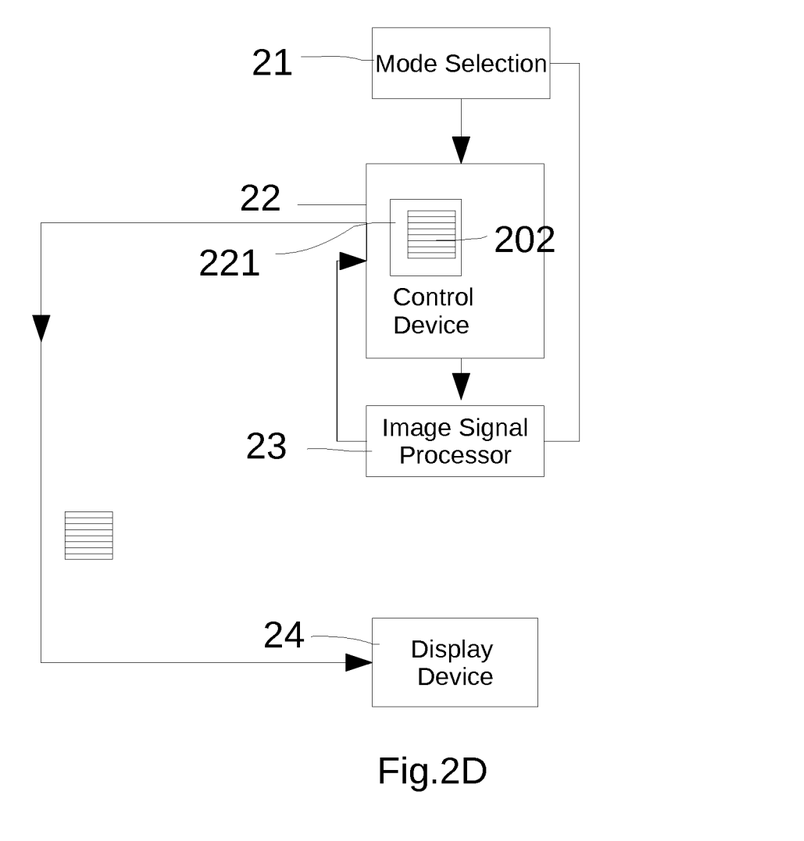

In addition, as illustrated in FIG. 2D, the image signal processed frame 202 is stored back to the same frame buffer. Before the mode is switched to the dynamic mode, the control logic 22, instead of the image signal processor 23, is responsible for supplying the image signal processed frame 202 to the display device 24. Such design saves power consumption because the image signal processor 23 is usually more complicated and the output frame does not need to be processed twice since a copy is stored in the frame buffer 221.

Figure 3:
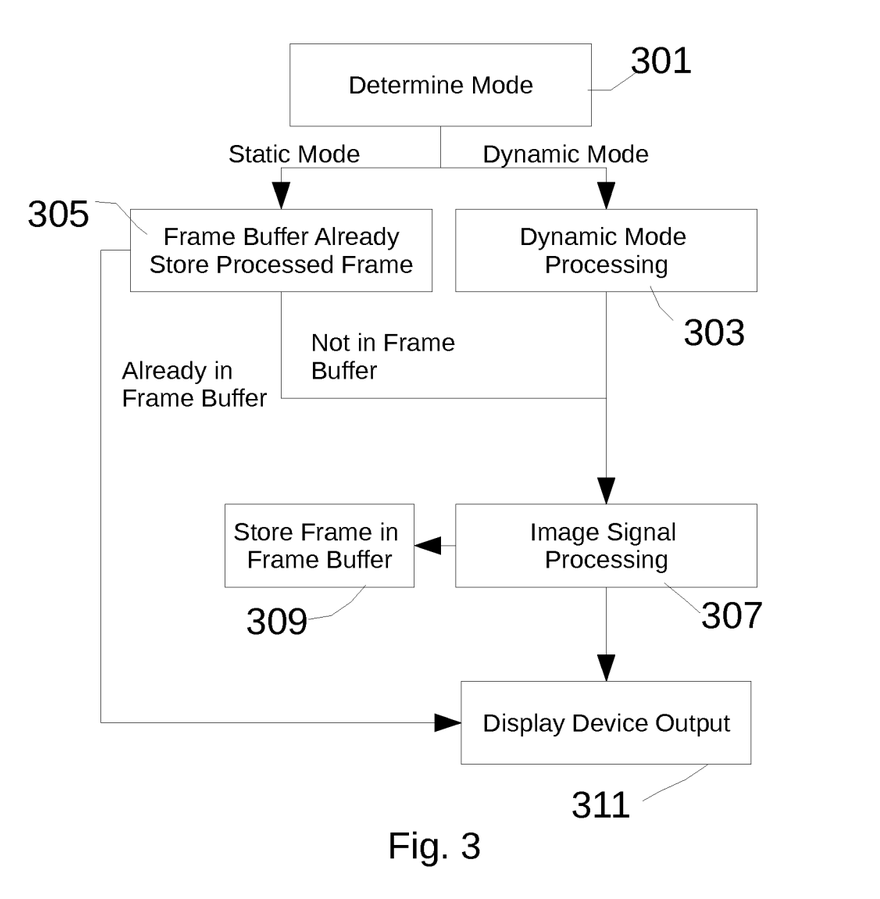
FIG. 3 is a flowchart illustrating an overview of a processing flow of an embodiment according to the present invention.

FIG. 3 is a flowchart illustrating an overview of a processing flow of an embodiment according to the present invention. In step 301, the mode between the static mode or the dynamic mode is determined. If the static mode is determined, the frame buffer is checked whether storing an image signal processed frame (step 305). If the frame buffer still stores original frame, instead of image signal processed frame, the input frame is sent to an image signal processor to perform image signal processing (step 307).

After the image signal processed frame is generated, the image signal processed frame is stored back to the frame buffer for future use (step 309).

If the image signal processed frame is stored in the frame buffer, the image signal processed frame is output to the display device (step 311).

Figure 4:
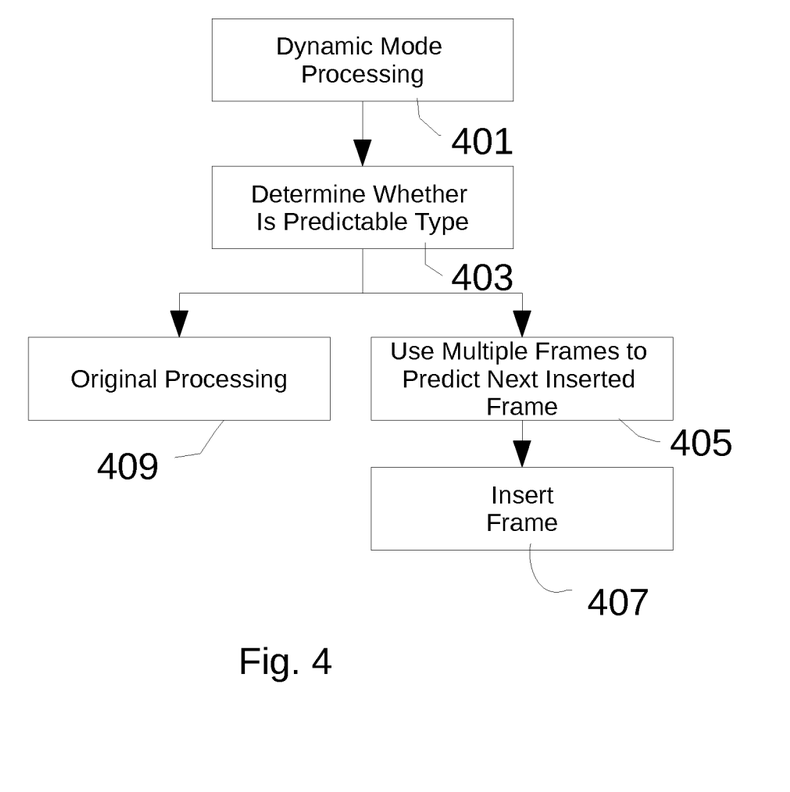
FIG. 4 is a flowchart illustrating a processing flow in a dynamic mode of an embodiment according to the present invention.

FIG. 4 is a flowchart illustrating a processing flow in a dynamic mode of an embodiment according to the present invention. If the dynamic mode is determined, the dynamic mode processing (step 401) is performed. The input frames are compared to determine whether it is suitable for using prediction to generate inserting frames to perform frame rate conversion (step 403).

If the determined result shows a prediction processing is proper, multiple frames are used for predict one or more than one inserting frames (Step 405). When the inserting frames are generated, the frame is inserted (step 407).

In a preferred embodiment, the motion vectors under bets match blocks between the previous frame and the current frame are calculated as a basis for determining whether prediction is proper. Specifically, if a sufficient number of motion vectors show that the previous frame is panned to shift to the current frame, the previous frame and the current frame are suitable for generating inserting frames after the current frame and before the next frame. Such scenario is very common on current mobile devices, e.g. users moving the screen with finger touch and thus can saves a lot of energy and enhance performance.

Figure 5:
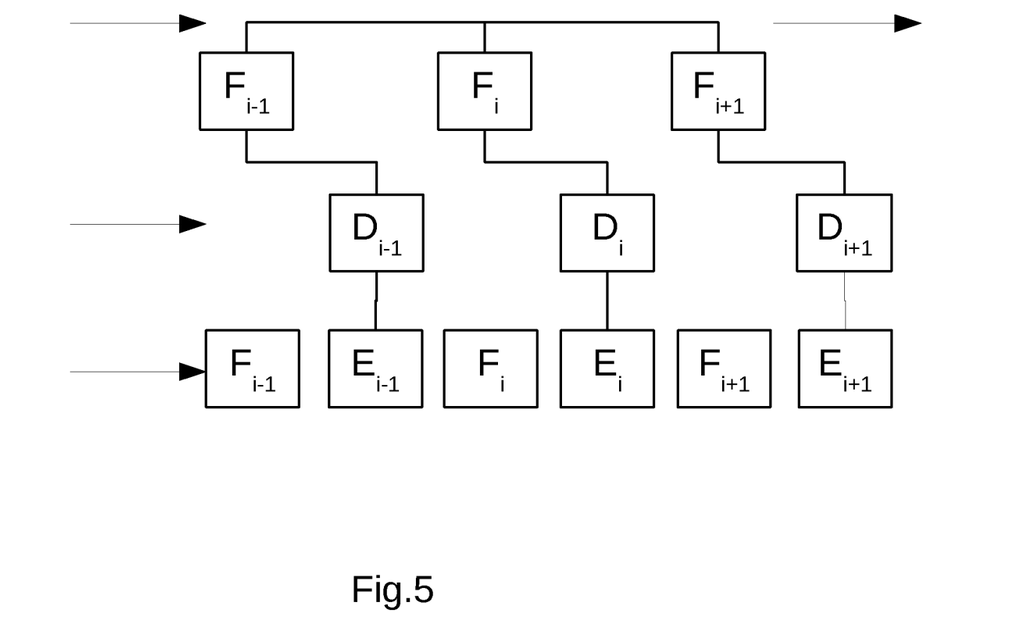
FIG. 5 is a diagram illustrating creating an inserting frame of an embodiment according to the present invention.

FIG. 5 is a diagram illustrating creating an inserting frame of an embodiment according to the present invention. A series of input frames Fi−1, Fi and Fi+1 are input to the semiconductor display driver device. The Fi is taken as the current frame, the Fi−1 is taken as the previous frame and the Fi+1 is taken as the next frame in this example. The difference Di between the Fi−1 and Fi are motion vectors information, e.g. the mean value of motion vectors of the previous frame Fi−1 compared with the current frame Fi.

The difference Di is used for generating an inserting frame Ei based on the current frame Fi. For example, the motion vector from the previous frame and the current frame is used for predicting the inserting frame Ei. Such procedure may be repeated to obtain necessary inserting frames to achieve frame rate conversion.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method of frame rate conversion comprising:
   receiving a plurality of input frames comprising a previous frame, a current frame and a next frame, wherein only one frame buffer is shared for the previous frame, the current frame and the next frame;
   outputting the current frame;
   calculating a changing trend between the current frame and the previous frame;
   modifying the current frame to generate at least one inserting frame according to the changing trend;
   calculating the changing trend between the current frame and the previous frame by comparing the image signal processing result of the current frame and the previous frame;
   outputting the inserting frame to achieve frame conversion; and outputting the next frame after outputting the inserting frame.

2. The method of claim 1, wherein when there are more than one inserting frames to be calculate, dividing the changing trend to corresponding sub-trends to be allocated to the inserting frames.

3. The method of claim 1, wherein the changing trend is obtained by reference to overall motion vectors reflecting changes between the current frame and the previous frame.

4. The method of claim 3, wherein the overall motion vectors are collection of motion vectors obtained by searching best matched blocks of the previous frame in the current frame.

5. A semiconductor display driver device connected to a video processor for processing a series of input frames, comprising:
- a detector for detecting whether the video processor is instructing the image processing apparatus to run in a static mode, wherein in the static mode, no frame change is occurred;
- a frame buffer;
- a control device for storing one input frame in the frame buffer if the static mode is determined; and
- an image signal processor for converting said one input frame to an output frame to a display device;
- wherein the control device replaces said one input frame in the frame buffer with the output frame and directly outputs the output frame to the display device bypassing the image signal processor after the output frame is stored in the frame buffer.

6. The semiconductor display driver device of claim 5, wherein the semiconductor display driver device is integrated as a die.

7. The semiconductor display driver device of claim 6, wherein the frame buffer is a SRAM component.

8. The semiconductor display driver device of claim 5, further comprising a frame rate converter for generating corresponding inserting frames to be output to the display device to achieve a predetermined frame rate.

9. The semiconductor display driver device of claim 8, wherein the semiconductor display driver device is used for driving a LCD monitor in a mobile device.

10. The semiconductor display driver device of claim 5, wherein when the detector detects a dynamic mode in which the series of input frames are received continuously from the video processor, the control device compares difference among the input frames and adopts different processing for generating the output frames according to the compared difference.

11. The semiconductor display driver device of claim 10, wherein the series of input frames comprise a previous frame, a current frame and a next frame, and when the compared difference is smaller than a predetermined threshold, the control device outputs the current frame, calculates a changing trend between the current frame and the previous frame, modifies the current frame to generate at least one inserting frame according to the changing trend, outputs the inserting frank after outputting the current frame to achieve frame conversion, and outputs the next frame after outputting the inserting frame.

12. The semiconductor display driver device of claim 11, wherein when there are more than one inserting frames to be calculate, dividing the changing trend to corresponding sub-trends to be allocated to the inserting frames.

13. The semiconductor display driver device of claim 11, wherein the changing trend is obtained by reference to overall motion vectors reflecting changes between the current frame and the previous frame.

14. The semiconductor display driver device of claim 11, wherein the overall motion vectors are collection of motion vectors obtained by searching best matched blocks of the previous frame in the current frame.

15. The semiconductor display driver device of claim 11, wherein only one frame buffer is shared for the previous frame, the current frame and the next frame.

16. The semiconductor display driver device of claim 5, further comprising an enabling device for the video processor to turn on or turn off the modifying the current frame to generate at least one inserting frame according to the changing trend.

17. A mobile multimedia apparatus, comprising:
- a display panel;
- a video processor; and
- a display driver device for receiving a plurality of input frames from the video processor and for driving the display panel, wherein the video processor and the display driver device are two separate semiconductor dies and the display driver device comprises a frame rate converter for performing frame rate output to the display panel.

18. The mobile multimedia apparatus of claim 17, wherein the series of input frames comprise a previous frame, a current frame and a next frame; outputting the current frame, the display driver device outputs the current frame, calculates a changing trend between the current frame and the previous frame, modifies the current frame to generate at least one inserting frame according to the changing trend, outputs the inserting frame after outputting the current frame to achieve frame conversion, and outputs the next frame after outputting the inserting frame.

* * * * *